(12) United States Patent
Hisada et al.

(10) Patent No.: US 10,456,865 B2
(45) Date of Patent: Oct. 29, 2019

(54) WELDING METHOD AND WELDING STRUCTURE

(71) Applicant: TOYOTA JIDOSHA KABUSHIKI KAISHA, Toyota-shi, Aichi-ken (JP)

(72) Inventors: Kohei Hisada, Nagoya (JP); Shuhei Ogura, Nagakute (JP); Junichiro Makino, Nagakute (JP); Kazuyuki Ogusu, Okazaki (JP); Masahiro Nakata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 14/691,028

(22) Filed: Apr. 20, 2015

(65) Prior Publication Data
US 2015/0298255 A1 Oct. 22, 2015

(30) Foreign Application Priority Data
Apr. 22, 2014 (JP) ................................ 2014-088091

(51) Int. Cl.
| B23K 26/22 | (2006.01) |
| B23K 26/32 | (2014.01) |
| B23K 101/18 | (2006.01) |
| B23K 103/10 | (2006.01) |

(52) U.S. Cl.
CPC .............. *B23K 26/22* (2013.01); *B23K 26/32* (2013.01); *B23K 2101/18* (2018.08); *B23K 2103/10* (2018.08)

(58) Field of Classification Search
CPC ..... B23K 11/002; B23K 11/115; B23K 11/16; B23K 2201/18; B23K 2203/04; B23K 2203/16; B23K 2203/42; B23K 26/244; B23K 26/32; B23K 26/362; B23K 26/402; B23K 31/02
USPC ..................................... 219/121.64; 428/594
See application file for complete search history.

(56) References Cited

U.S. PATENT DOCUMENTS

| 3,881,084 A * | 4/1975 | Baardsen ........... B23K 15/0093 219/121.64 |
| 5,783,794 A * | 7/1998 | Oikawa ................. B23K 11/115 219/118 |
| 7,807,939 B2 * | 10/2010 | Nagashima ........ B23K 26/0604 219/121.64 |
| 2006/0011592 A1 * | 1/2006 | Wang .................. B23K 26/032 219/121.64 |
| 2007/0051499 A1 * | 3/2007 | Kaimura ............... B21C 37/151 165/104.19 |

(Continued)

FOREIGN PATENT DOCUMENTS

| JP | H06-155058 A | 6/1994 |
| JP | 2001-062575 | * 3/2001 ............. B23K 26/00 |

(Continued)

*Primary Examiner* — Dana Ross
*Assistant Examiner* — Joe E Mills, Jr.
(74) *Attorney, Agent, or Firm* — Oliff PLC

(57) ABSTRACT

A welding method for joining together a plurality of welding objects by overlapping the plurality of welding objects and performing laser welding includes forming a weld by forming a plurality of nuggets along a virtual closed curve on the welding objects, by laser welding. A ratio of a diameter of the nuggets to a pitch dimension between the nuggets that are adjacent to each other is larger than ½ and no more than 1.

11 Claims, 13 Drawing Sheets

(56) References Cited

U.S. PATENT DOCUMENTS

| | | | | |
|---|---|---|---|---|
| 2011/0272384 A1* | 11/2011 | Matsushita | ............ | B23K 11/115 219/91.2 |
| 2012/0234799 A1* | 9/2012 | Vanimisetti | ........ | B23K 11/3018 219/117.1 |
| 2013/0168371 A1* | 7/2013 | Furusako | ............... | B23K 26/22 219/121.64 |
| 2014/0227549 A1* | 8/2014 | Tanizawa | ................. | B23K 9/18 428/586 |
| 2014/0377578 A1* | 12/2014 | Hisada | ................... | B23K 26/22 428/594 |
| 2016/0158865 A1* | 6/2016 | Furusako | ............... | B23K 9/007 219/137 WM |
| 2016/0236294 A1* | 8/2016 | Sawanishi | ............. | B23K 11/115 |
| 2016/0368086 A1* | 12/2016 | Lott | ................... | B23K 26/0624 |

FOREIGN PATENT DOCUMENTS

| | | | | |
|---|---|---|---|---|
| JP | 2001-062575 A | | 3/2001 | |
| JP | 2001062575 A | * | 3/2001 | |
| JP | 3312659 B2 | | 8/2002 | |
| JP | 2009-233712 A | | 10/2009 | |
| JP | WO 2012146965 A1 | * | 11/2012 | ............ B23K 26/22 |
| JP | 2013-132686 A | | 7/2013 | |
| JP | WO 2013098621 A1 | * | 7/2013 | ............ B23K 26/22 |
| JP | 2014180686 A | * | 9/2014 | |
| WO | 2013/098621 A1 | | 7/2013 | |

\* cited by examiner

COMPARATIVE EXAMPLE

EXAMPLE EMBODIMENT

WELDING METHOD AND WELDING STRUCTURE

INCORPORATION BY REFERENCE

The disclosure of Japanese Patent Application No. 2014-088091 filed on Apr. 22, 2014 including the specification, drawings and abstract is incorporated herein by reference in its entirety.

BACKGROUND OF THE INVENTION

1. Field of the Invention

The invention relates to a welding method and a welding structure, and more particularly, relates to a welding method and a welding structure of laser welding.

2. Description of Related Art

One widely used welding method for joining together a plurality of overlapped welding objects (such as metal plates, for example), is a welding method by laser welding, because it offers advantages such as that there is little processing distortion, high speed welding is possible, and few portions are affected by residual heat. With a laser welding method, a weld is typically formed in a straight line by scanning laser light in a straight line.

Here, stress concentrates at both end portions of the weld formed in a straight line. As a result, various problems, such as that this kind of weld tends to be defective which makes it difficult to achieve consistent weld quality, have been pointed out. Therefore, in order to solve these kinds of problems, a laser welding method that forms welds in a variety of shapes has been proposed.

For example, Japanese Patent Application Publication No. 2009-233712 (JP 2009-233712 A) describes a laser welding method that forms a weld in two "C" shapes arranged facing one another. With this kind of laser welding method, a curved portion of the weld that is a C-shaped arc is arranged on the end portions on both sides of a weld zone where stress tends to concentrate. On the other hand, a start point (i.e., a starting point where the laser starts to be emitted) and an end point (i.e., an end point where the laser stops being emitted) of the weld are arranged in an intermediate portion that is between the end portions on both sides and tends not to be affected by external force (does not contribute much to improving weld strength). As a result, the start point and the end point of the weld are not arranged at the end portions on both sides where stress tends to concentrate, so the concentration of stress at the weld is mitigated. Also, with the laser welding method in JP 2009-233712 A, the weld is formed in two "C" shapes that face each other, so welding of the intermediate portion that tends not to be affected by external force is omitted. That is, production efficiency is improved because a position that does not contribute much to an improvement of weld strength is not welded.

Here, with a welding structure formed by laser welding, there is tendency for stress to concentrate at a boundary between the weld and base material. Therefore, cracking may occur at the boundary of the weld and the base material. Moreover, if the boundary lies in the same direction as the direction in which the crack progresses, the crack will tend to progress further. If this happens, the welded objects that are joined together may fracture (i.e., break apart).

However, a weld formed by the laser welding method according to JP 2009-233712 A described above is no stronger than a weld formed in a circular shape or circumferential shape of the same size as the weld formed in two C shapes. Therefore, a weld formed by the laser welding method according to JP 2009-233712 A is no more effective against the problem described above than a weld formed in a circular shape or circumferential shape of the same size.

SUMMARY OF THE INVENTION

The invention thus provides a welding method capable of improving weld strength, and a welding structure having improved weld strength.

A first aspect of the invention relates to a welding method for joining together a plurality of welding objects by overlapping the plurality of welding objects and performing laser welding. This welding method includes forming a weld by forming a plurality of nuggets along a virtual closed curve on the welding objects, by laser welding. A ratio of a diameter of the nuggets to a pitch dimension between the nuggets that are adjacent to each other is larger than ½ and no more than 1.

Also, a second aspect of the invention relates to a welding structure. This welding structure includes a plurality of welding objects joined together by a weld formed by laser welding. The weld includes a plurality of nuggets formed along a virtual closed curve on the welding objects. A ratio of a diameter of the nuggets to a pitch dimension between the nuggets that are adjacent to each other is larger than ½ and no more than 1.

By forming the plurality of nuggets such that the ratio of a diameter of the nuggets to a pitch dimension between the nuggets that are adjacent to each other is larger than ½ and no more than 1, adjacent nuggets are arranged intermittently with the base material sandwiched therebetween. Therefore, the base material (i.e., the welding objects) are provided in the direction in which the crack progresses. As a result, the crack is able to be inhibited from progressing. Consequently, the weld strength is able to be improved.

Also, in the aspect described above, a ratio of the diameter of the nuggets to a thickness of the overlapped plurality of welding objects may be no more than 3. This kind of structure makes it possible to inhibit the nuggets from sagging under their own weight, even if welding is performed with the welding objects in vertically arranged positions. Thus, it is possible to inhibit the nuggets from sagging under their own weight regardless of the welding point posture. Furthermore, weld strength equivalent to that obtained when welding is performed with the welding objects in horizontally arranged positions is able to be ensured.

Also, in the aspect described above, a ratio of the diameter of the nuggets to a thickness of the welding object on a side where laser light is not emitted, of the plurality of welding objects, may be no more than 1.5. This kind of structure makes it possible to inhibit a protrusion from being formed on the side where the laser light is not emitted, even when the welding objects are made of die-cast material or castings or the like. Thus, welding is able to be appropriately performed even when the welding objects are made of die-cast material or castings or the like.

According to the first and second aspects of the invention, a welding method capable of improving weld strength, and a welding structure having improved weld strength, are able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

Figure 1A:
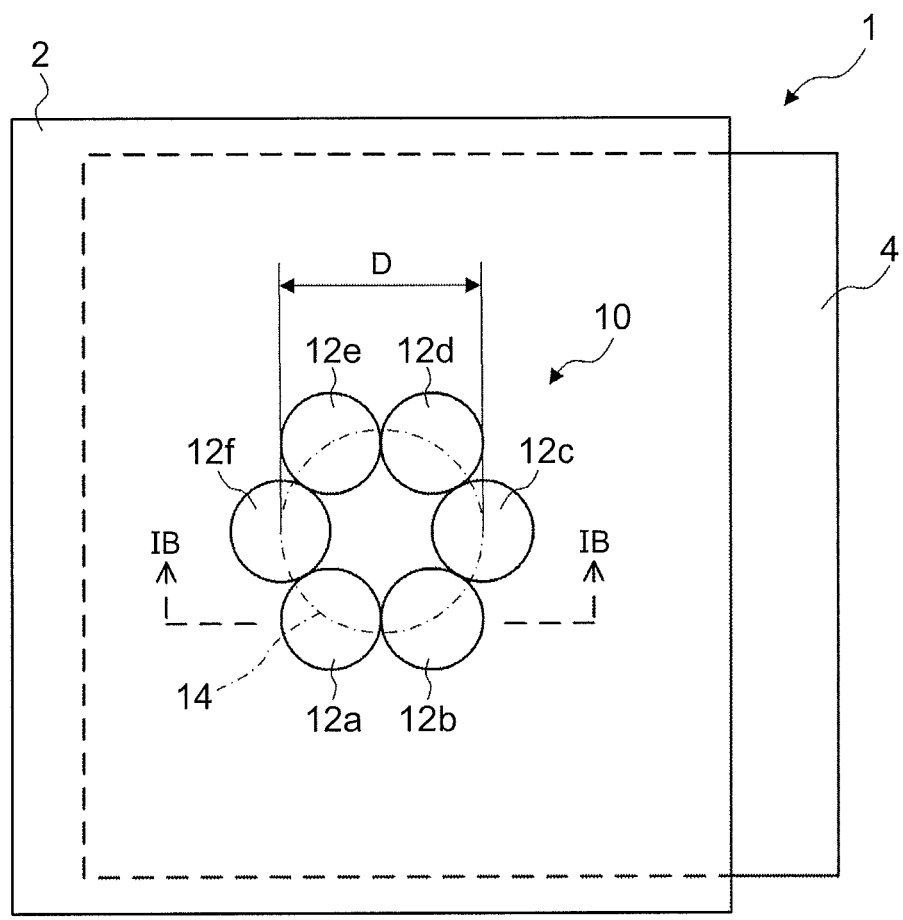
FIG. 1A view of a welding structure formed by a welding method according to a first example embodiment of the invention.
Figure 1B:
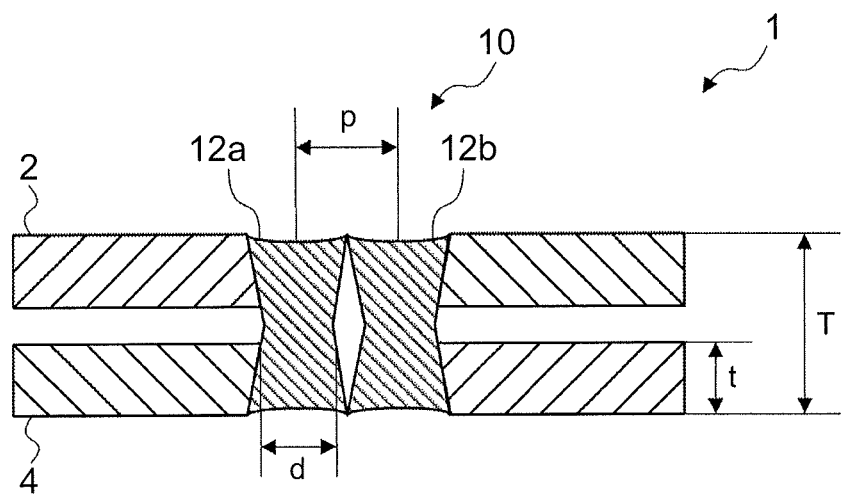
FIG. 1B is another view of the welding structure formed by the welding method according to the first example embodiment.

Hereinafter, example embodiments of the invention will be described with reference to the accompanying drawings. FIG. 1 is a view of a welding structure 1 formed by a welding method according to a first example embodiment of the invention, with FIG. 1A being a plan view of the welding structure 1, and FIG. 1B being a sectional view of the welding structure 1 taken along line IB-IB in FIG. 1A.

The welding structure 1 includes a plurality of welding objects (such as metal plates, for example). In this example embodiment, the welding structure 1 includes two welding objects 2 and 4 that are overlapped with each other. The welding objects 2 and 4 are joined together by a weld 10, in a state overlapped with each other. The weld 10 is formed by laser welding, as will be described later. At the time of laser welding, laser light is emitted at the welding object 2. In other words, the welding object 4 is a welding object on a side where laser light is not emitted.

The weld 10 is formed by a plurality of nuggets 12. In the example in FIG. 1, the weld 10 has six nuggets 12a, 12b, 12c, 12d, 12e, and 12f. The number of nuggets 12 of the weld 10 is arbitrary. Also, each nugget 12 is formed in a generally circular shape, for example, as shown in FIG. 1A. The shape of the nuggets 12 is not limited to being circular, and may also be oblong or polygonal shaped, for example.

The nuggets 12a, 12b, 12c, 12d, 12e, and 12f are formed arranged along a virtual closed curve 14 denoted by the dashed line. In this example embodiment, an example in which the virtual closed curve 14 is circular is described, but the virtual closed curve 14 is not limited to being circular. The virtual closed curve 14 may also be an ellipse, or a suitable curve or polygonal shape. In this example embodiment, the virtual closed curve 14 is a circle having a diameter D.

As shown in FIG. 1B, the diameter of each nugget 12 is d. Also, the pitch dimension of between adjacent nuggets 12 (for example, between the nugget 12a and the nugget 12b) is p. In this case, the nuggets 12 are arranged such that ½<d/p≤1. In other words, the nuggets 12 are arranged such that a ratio d/p of the nugget diameter d to the pitch dimension p is larger than ½, and no more than 1.

The pitch dimension p is a value indicative of the distance (interval) between adjacent nuggets 12. For example, when the nuggets 12 are circular shaped, the pitch dimension p may indicate the distance between the centers of adjacent nuggets 12. For example, the pitch dimension p between the nugget 12a and the nugget 12b may be the distance between a position near the center of the nugget 12a and a position near the center of the nugget 12b.

Also, the nugget diameter d may be the diameter of the nuggets 12 when the nuggets 12 have circular shapes. On the other hand, if the nuggets 12 have elliptical shapes, the nugget diameter d may be the length of the long axis, or it may be an average value of the length of the long axis and the length of the short axis. That is, the nugget diameter is a value indicative of the size (outside diameter dimension) of the nuggets 12.

Also, the pitch dimension p does not have to be strictly constant in the weld 10. That is, the pitch dimension p between the nugget 12a and the nugget 12b does not have to be the same as the pitch dimension p between the nugget 12b and the nugget 12c, for example. Further, the diameter d of each nugget 12 does not have to be strictly the same. For example, the diameter of the nugget 12a does not have to be the same as the diameter of the nugget 12b.

Also, as shown in FIG. 1B, a thickness (total thickness) of the welding objects 2 and 4, including a gap between the welding objects 2 and 4, is T. Also, the thickness of the welding object 4 that is the welding object on the side where the laser light is not emitted is t. These thicknesses, i.e., the total thickness T and the thickness t of the welding object 4, will be described in another example embodiment that will be described later.

FIG. 2 is a view of the welding method according to the first example embodiment. The welding method according to the first example embodiment is implemented by a welding apparatus 100. This welding apparatus 100 includes at least an emitting portion 102 and a control portion 104. The emitting portion 102 is a laser scanner such as a galvanometer scanner, for example, and emits laser light LA at a predetermined position on the welding object 2, by controlling the orientation of an internal galvanometer mirror. As a result, the nuggets 12 are formed in positions where the laser light LA is emitted. The control portion 104 controls the emitting portion 102 (more specifically, the orientation of the galvanometer mirror) such that a plurality of the nuggets 12 are formed under a condition of $½<d/p≤1$.

Also, there are a variety of methods, such as those described below, by which the nuggets 12 may be formed. However, any forming method may be employed in performing the welding method according to this example embodiment.

Figure 2A:
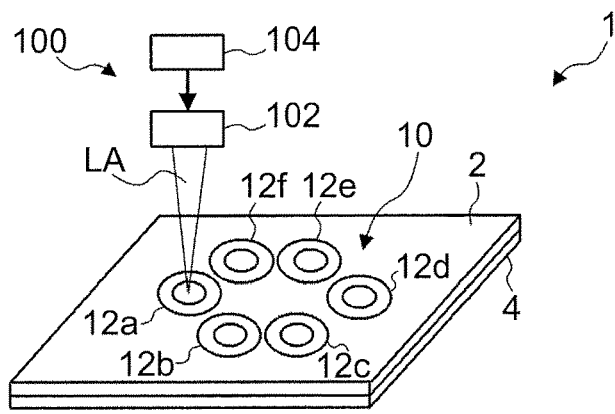
FIG. 2A is a view illustrating the welding method according to the first example embodiment.

FIG. 2A is a view illustrating a fixed point type forming method. With this fixed point forming method, circular nuggets 12 are formed by emitting the laser light LA for a fixed period of time at a predetermined point on the welding object 2, for example. More specifically, the control portion 104 controls the emitting portion 102 such that the laser light LA is emitted at a position where the nugget 12a is to be formed on the welding object 2. As a result, the emitting portion 102 emits the laser light LA for a fixed period of time at a position set by the control of the control portion 104, and forms the nugget 12a there. Once the nugget 12a is formed, the control portion 104 then controls the emitting portion 102 such that the laser light LA is emitted at a position where the nugget 12b is to be formed. The welding apparatus 100 then forms the nuggets 12b, 12c, 12d, 12e, and 12f on the welding objects 2 and 4 in the same manner.

Figure 2B:
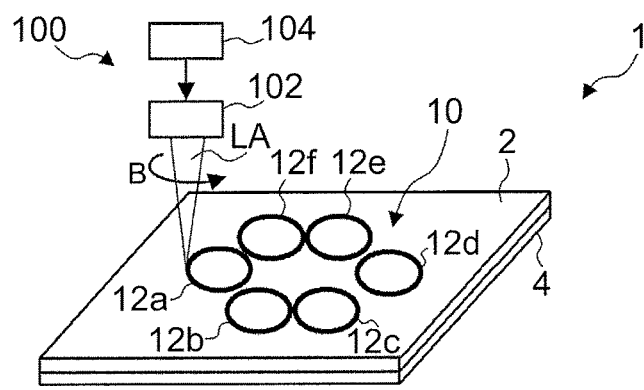
FIG. 2B is another view illustrating the welding method according to the first example embodiment.

FIG. 2B is a view of illustrating a "scanning type forming method". With this scanning type forming method, annular nuggets 12 are formed by scanning the laser light LA along a circumferential path (e.g., a path having the same shape as the outer periphery of the nuggets 12 in FIG. 1A), as shown by arrow B, on the welding object 2, for example. More specifically, the control portion 104 controls the emitting portion 102 such that the laser light LA is scanned along a circumferential path, at a position where the nugget 12a is to be formed on the welding object 2. As a result, the emitting portion 102 forms the cylindrical nugget 12a. Once the nugget 12a is formed, the control portion 104 then controls the emitting portion 102 such that the laser light LA is emitted at a position where the nugget 12b is to be formed. The welding apparatus 100 then forms the nuggets 12b, 12c, 12d, 12e, and 12f on the welding objects 2 and 4 in the same manner.

Figure 2C:
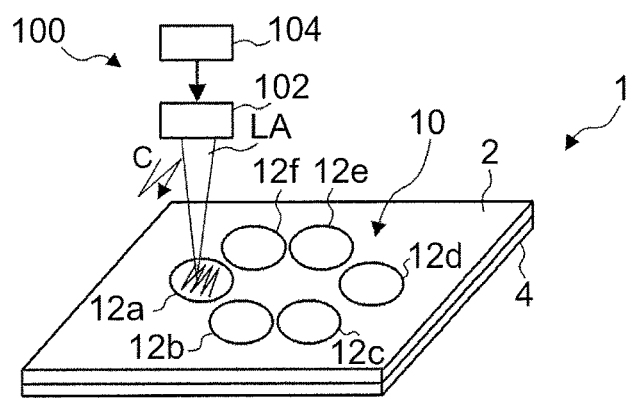
FIG. 2C is another view illustrating the welding method according to the first example embodiment.

FIG. 2C is a view illustrating a "fill-in type forming method". With this fill-in type forming method, first, an annular nugget is formed by scanning the laser light LA along a circumferential path. Next, a circular nugget 12 is formed by scanning the laser light LA so as to fill in the inside of the annular nugget that was formed, as shown by arrow C. More specifically, the control portion 104 controls the emitting portion 102 such that the laser light LA is scanned along a circumferential path at a position where the nugget 12a is to be formed on the welding object 2. As a result, the emitting portion 102 forms an annular nugget. Then, the control portion 104 controls the emitting portion 102 such that the laser light LA is scanned to fill in the inside of the annular nugget that was formed. As a result, the emitting portion 102 forms a circular nugget by scanning the laser light LA so as to fill in the inside of the annular nugget. Once the nugget 12a is formed, the control portion 104 then controls the emitting portion 102 such that the laser light LA is emitted at a position where the nugget 12b is to be formed. The welding apparatus 100 then forms the nuggets 12b, 12c, 12d, 12e, and 12f on the welding objects 2 and 4 in the same manner.

Figure 2D:
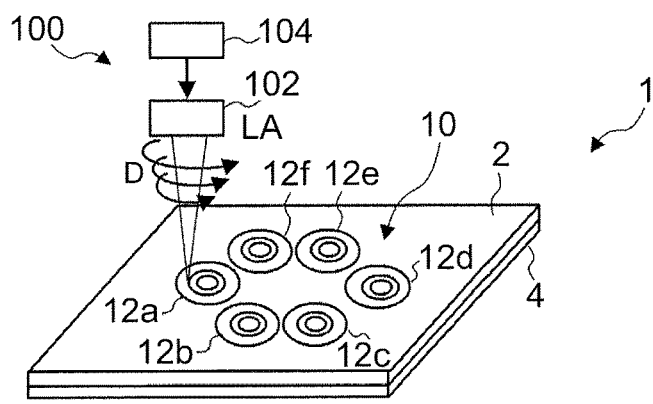
FIG. 2D is another view illustrating the welding method according to the first example embodiment.

FIG. 2D is a view illustrating a "screw type forming method". With this screw type forming method, a circular nugget 12 is formed by scanning the laser light LA along a spiral-shaped path, as shown by arrow D, on the welding object 2, for example More specifically, the control portion 104 controls the emitting portion 102 such that the laser light LA is scanned along a spiral-shaped path, at a position where the nugget 12a is to be formed on the welding object 2. As a result, the emitting portion 102 forms the circular nugget 12a. Once the nugget 12a is formed, the control portion 104 then controls the emitting portion 102 such that the laser light LA is emitted at a position where the nugget 12b is to be formed. The welding apparatus 100 then forms the nuggets 12b, 12c, 12d, 12e, and 12f on the welding objects 2 and 4 in the same manner.

FIG. 3 is a view of an example of the weld 10 formed by different numbers of nuggets 12, according to the welding structure 1. FIG. 3 shows cases in which the weld 10 is formed with three, four, and five nuggets (welding points).

Figure 3A:
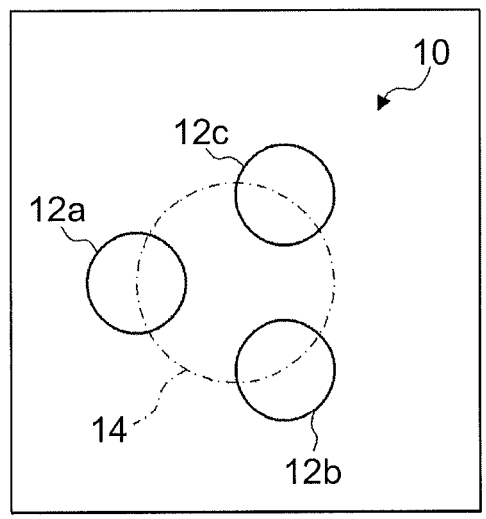
FIG. 3A is a view of one example of a weld formed by different numbers of nuggets, according to the first example embodiment.

FIG. 3A is a view of the weld 10 with three nuggets 12a, 12b, and 12c. The nuggets 12a, 12b, and 12c are formed arranged along the virtual closed curve 14 (e.g., a circle having the diameter D). Also, the diameter of each nugget 12 is d, and the pitch dimension between adjacent nuggets 12 is p. At this time, the nuggets 12 are arranged such that $½<d/p≤1$.

Figure 3B:
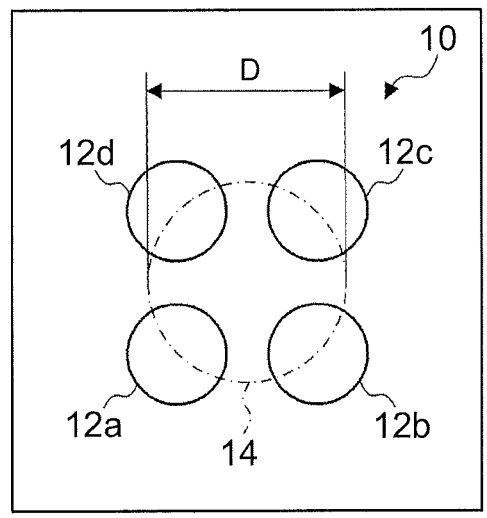
FIG. 3B is a view of another example of a weld formed by different numbers of nuggets, according to the first example embodiment.

FIG. 3B is a view of the weld 10 with four nuggets 12a, 12b, 12c, and 12d. The nuggets 12a, 12b, 12c, and 12d are formed arranged along the virtual closed curve 14 (e.g., a circle having the diameter D). Also, the diameter of each nugget 12 is d, and the pitch dimension between adjacent nuggets 12 is p. At this time, the nuggets 12 are arranged such that $½<d/p≤1$.

Figure 3C:
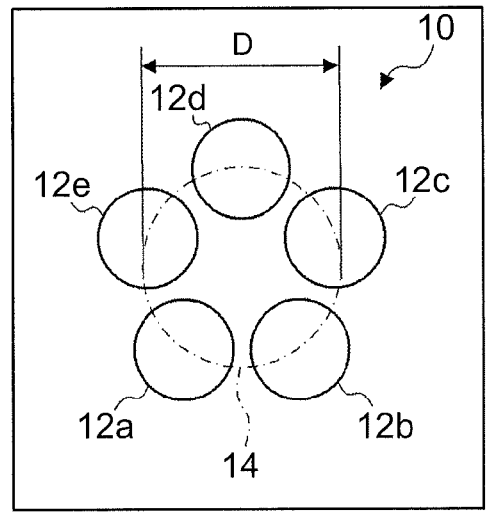
FIG. 3C is a view of yet another view of one example of a weld formed by different numbers of nuggets, according to the first example embodiment.

FIG. 3C is a view of the weld 10 with five nuggets 12a, 12b, 12c, 12d, and 12e. The nuggets 12a, 12b, 12c, 12d, and 12e are formed arranged along the virtual closed curve 14 (e.g., a circle having the diameter D). Also, the diameter of each nugget 12 is d, and the pitch dimension between adjacent nuggets 12 is p. At this time, the nuggets 12 are arranged such that $½<d/p≤1$.

Figure 4A:
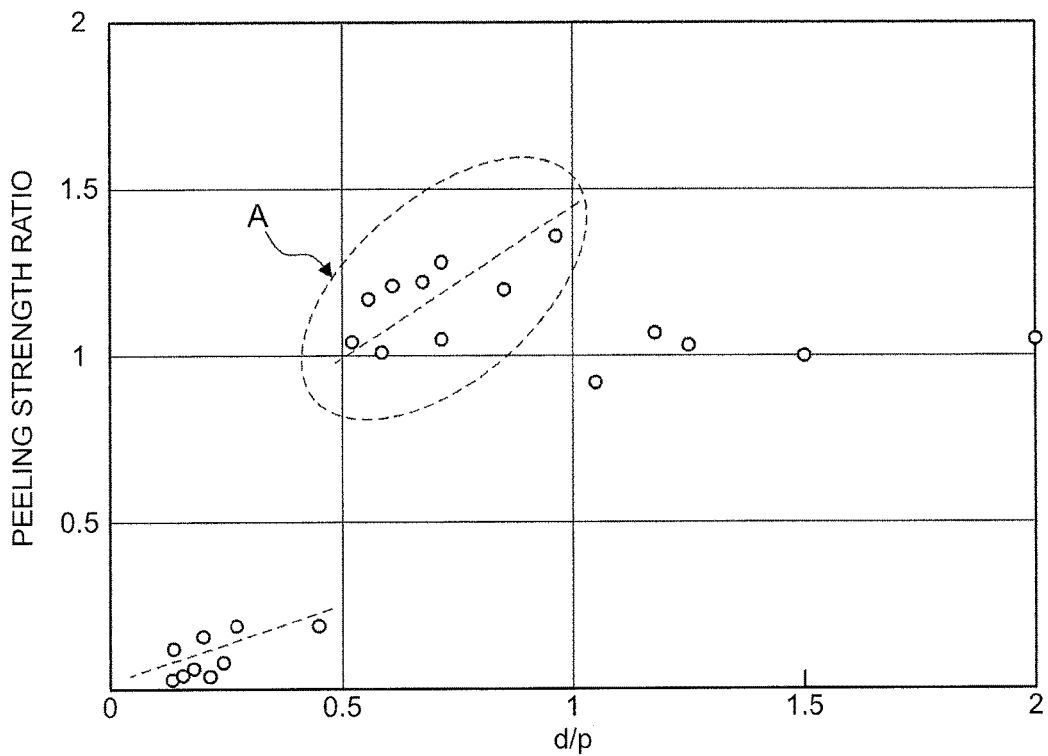
FIG. 4A is a graph showing a relationship between a ratio of nugget diameter to pitch dimension, and weld strength, according to the first example embodiment.
Figure 4B:
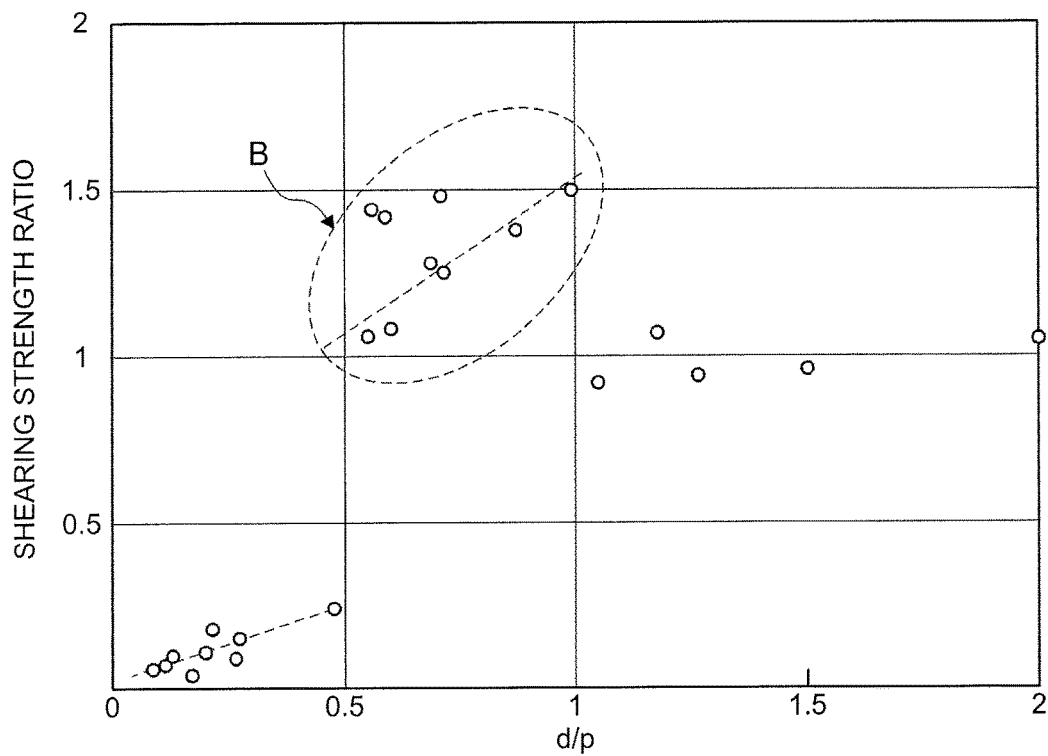
FIG. 4B is another graph showing a relationship between a ratio of nugget diameter to pitch dimension, and weld strength, according to the first example embodiment.

FIG. 4 is a graph showing the relationship between the ratio d/p of the nugget diameter d to the pitch dimension p, and the weld strength, according to the first example embodiment. Here, FIG. 4A is a graph showing the relationship between the ratio d/p of the nugget diameter d to the pitch dimension p, and a peeling strength ratio, and FIG. 4B is a graph showing the relationship between the ratio d/p of the nugget diameter d to the pitch dimension p, and a shearing strength ratio. The graph related to the example in FIG. 4 shows the results of a strength test performed under conditions in which the numbers of nuggets 12 is three, four, five, and six, 0.2<d/p<2, the welding object 2 is an aluminum alloy that is 1.2 mm thick, and the welding object 4 is an aluminum alloy that is 1.0 mm thick.

Here, the peeling strength is indicated by the maximum value of a tensile load that is applied in a peeling direction (i.e., a thickness direction of the welding objects) that peels apart the welding objects 2 and 4 that are joined together, that the welding objects 2 and 4 (i.e., the weld 10) can bear without peeling apart, for example. Also, the shearing strength is indicated by the maximum value of a tensile load that is applied in a shearing direction (i.e., a direction orthogonal to the thickness direction of the welding objects) to the welding objects 2 and 4 that are joined together, that the welding objects 2 and 4 (i.e., the weld 10) can bear without peeling apart in the shearing direction, for example.

Also, the peeling strength ratio indicates a ratio of the peeling strength of the weld 10 formed by the welding method according to the first example embodiment, when the peeling strength when the welding objects are joined by one generally circular nugget the same size (e.g., diameters D+d) as the weld 10 is 1. Similarly, the shearing strength ratio indicates a ratio of the shearing strength of the weld 10 formed by the welding method according to the first example embodiment, when the shearing strength when the welding objects are joined by one generally circular nugget the same size (e.g., diameters D+d) as the weld 10 is 1.

As shown in FIG. 4A, when d/p<0.5, the peeling strength ratio is less than 1. In other words, at this time, the peeling strength of the weld 10 formed by the welding method according to the first example embodiment is less than the peeling strength when the welding objects are joined by one generally circular nugget of the same size (e.g., diameters D+d) as the weld 10.

When d/p<0.5, the nugget diameter is smaller than the pitch dimension p, so the nuggets 12 are separated. Therefore, regarding the strength characteristic, fracturing occurs when a load that exceeds the strength of each single nugget 12 is applied without the plurality of nuggets 12 affecting one another. Therefore, in this case, the nuggets 12 each fracture separately on the inside. That is, when d/p<0.5, the welding method according to the first example embodiment does not contribute to an improvement in weld strength.

Also, when 1<d/p, the peeling strength ratio is around 1. In other words, the peeling strength of the weld 10 formed by the welding method according to the first example embodiment is approximately the same as the peeling strength when the welding objects are joined by a single generally circular nugget of the same size (e.g., diameters D+d) as the weld 10.

When 1<d/p, the nugget diameter is too large for the pitch dimension p, so adjacent nuggets 12 end up overlapping with each other. Thus, fracturing occurs along the outer periphery of the weld 10 where the nuggets 12 are grouped (i.e., the plurality of nuggets 12 becomes integrated and fractures). Also, in this case, adjacent nuggets 12 are overlapped, so the shape of the weld 10 formed by the plurality of nuggets 12 is almost the same, in terms of the strength characteristic, as the shape of a single generally circular nugget the same size as the weld 10. Therefore, in this case, the strength characteristic is the same as the strength characteristic when the welding objects are joined by a single generally circular nugget of the same size as the weld 10. That is, when 1<d/p, the welding method according to the first example embodiment does not contribute much to an improvement in weld strength.

On the other hand, when 0.5<d/p≤1, the peeling strength ratio is greater than 1, as shown by region A (indicated by the broken line). In other words, at this time, the peeling strength of the weld 10 formed by the welding method according to the first example embodiment is greater than the peeling strength when the welding objects are joined by a single generally circular nugget of the same size (e.g., diameters D+d) as the weld 10. Therefore, in this case, the weld strength is able to be improved.

When 0.5<d/p≤1, adjacent nuggets 12 are separated from each other, so base material (i.e., the welding objects 2 and 4) is provided between the adjacent nuggets 12. Therefore, the nuggets are inhibited from becoming integrated and fracturing all at once. Moreover, adjacent nuggets 12 are not too far apart, so the nuggets are also inhibited from fracturing separately. Therefore, in this case, fracturing occurs in the base material (i.e., the welding objects 2 and 4).

Also, as shown in FIG. 4B, with the shearing strength characteristic as well, results similar to the results shown in FIG. 4A are able to be obtained, as shown by region B (indicated by the broken line). That is, with the shearing strength as well, the weld strength is able to be improved when 0.5<d/p≤1.

Figure 5A:
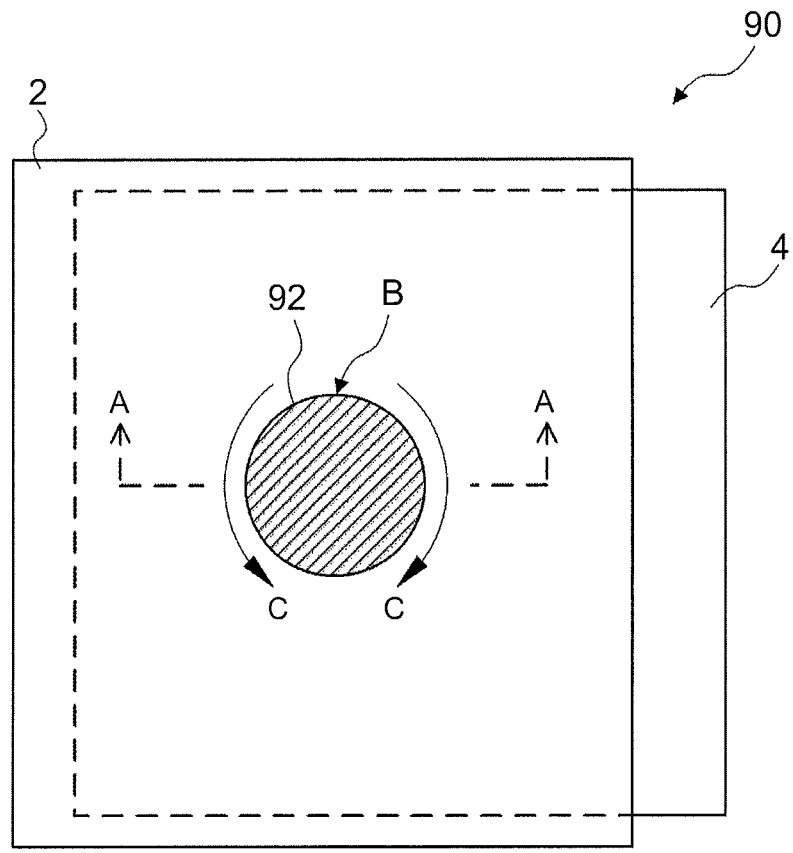
FIG. 5A is a view of a welding structure formed by a welding method according to a comparative example.
Figure 5B:
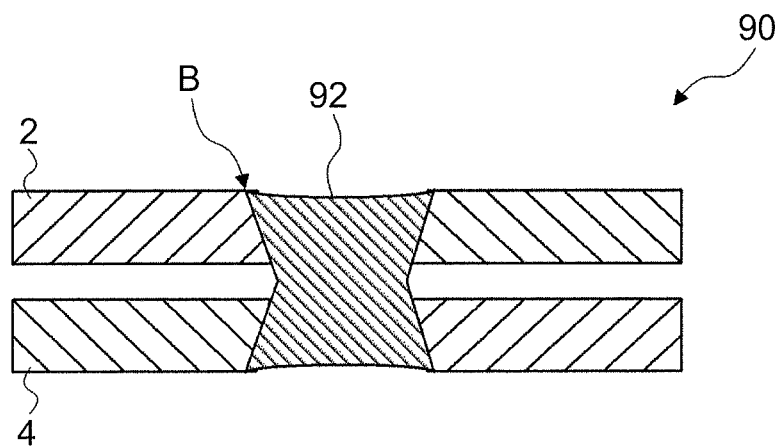
FIG. 5B is another view of the welding structure formed by the welding method according to the comparative example.

Hereinafter, the mechanism of the welding method according to this example embodiment will be described. FIG. 5 is a view of a welding structure 90 formed by a welding method according to a comparative example, with FIG. 5A being a plan view of the welding structure 90, and FIG. 5B being a sectional view of the welding structure 90 taken along line A-A in FIG. 5A.

The welding structure 90 includes two welding objects 2 and 4 that are overlapped with each other, similar to the welding structure 1 according to the first example embodiment. The welding objects 2 and 4 are joined together by a weld 92, in a state overlapped with each other. The weld 92 is formed by laser welding. The weld 92 is formed by a single generally circular nugget.

Here, with laser welding, stress concentrates at the boundary (indicated by arrow B in FIG. 5B) between the weld 92 that is the molten portion, and the welding objects 2 and 4 are the base material. Therefore, a crack tends to form at this boundary position. Moreover, the boundary position continues along in the circumference of the circular weld 92, as shown by arrows C in FIG. 5A. That is, in the comparative example, the crack progresses as shown by arrows C, and the boundary position lies in the direction of this progression, so the crack tends to progress easily.

Figure 6:
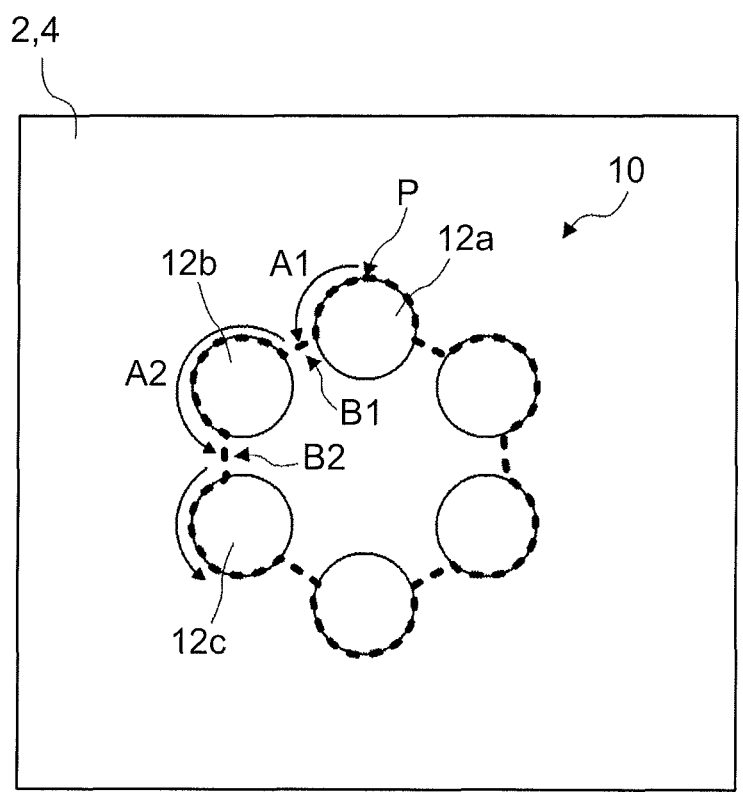
FIG. 6 is a view illustrating a mechanism of fracturing of the weld according to the first example embodiment.

FIG. 6 is a view illustrating the mechanism of fracturing of the weld 10 according to the welding structure 1. First, at the weld 10, stress concentrates at point P of the boundary between the nugget 12a and the welding objects 2 and 4 that are the base material, and cracking occurs. Then, the crack progresses along the circumference of this nugget 12a, as shown by arrow A1, because the boundary between the nugget 12a and the base material (i.e., the welding objects 2 and 4) lies along the circumference of the nugget 12a that is the outer periphery (indicated by the bold broken line) of the weld 10.

Then, at point B1, the circumference of the nuggets 12 comes away from the outer periphery of the weld 10 and comes to be positioned inside the weld 10. Therefore, the direction of progression of the crack changes to the direction indicated by arrow A2. Thus, at point B1, progression of the crack is inhibited compared to when the direction of progression of the crack is continuous. Furthermore, the welding objects 2 and 4 that are the base material are present at point B1. In other words, the boundary between the nuggets 12 and the base material is not present at point B1. Therefore, at point B1, progression of the crack is inhibited compared to when the boundary between the nuggets 12 (i.e., the weld 10) and the base material continues. This is also the same at point B2. In this way, with the welding method according to the first example embodiment, adjacent nuggets 12 are arranged intermittently with the base material sandwiched in between, so progression of the crack is able to be inhibited in the overall weld 10. As a result, the weld strength is able to be improved.

Figure 7A:
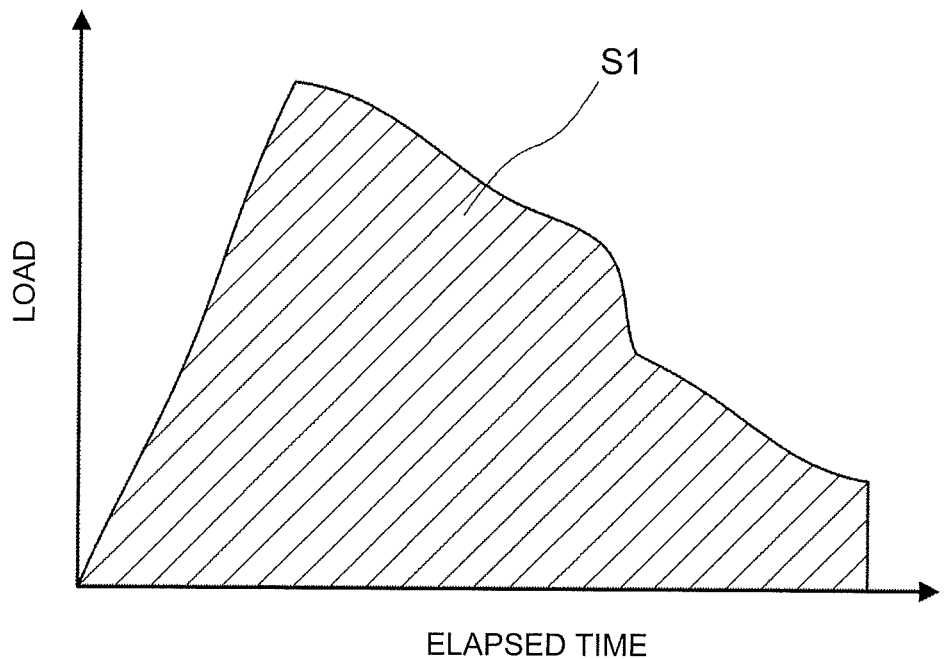
FIG. 7A is a view showing the results of a strength test of the welding structure formed by the welding method according to the first example embodiment.
Figure 7B:
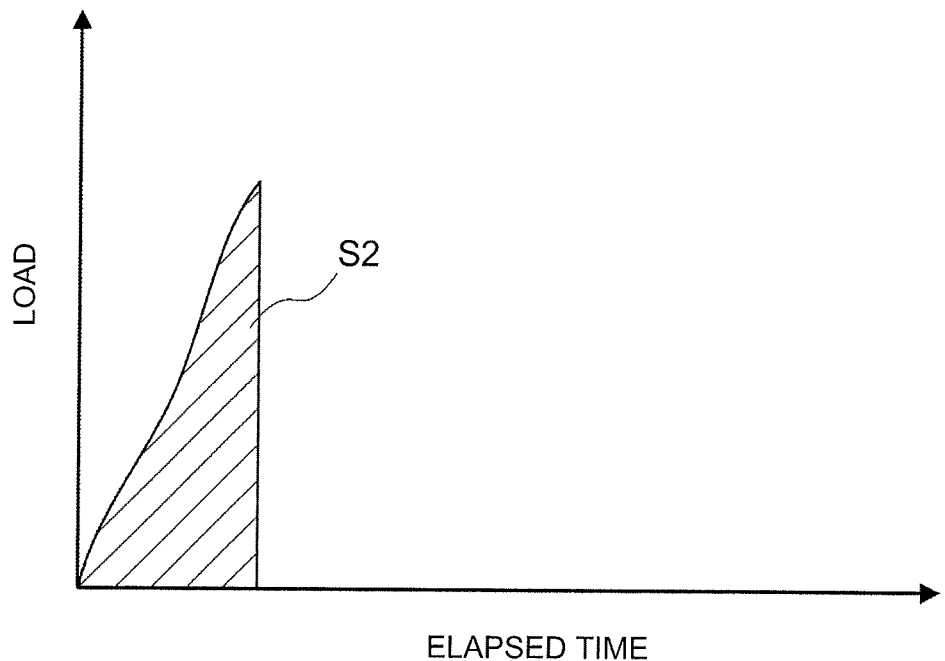
FIG. 7B is a view showing the results of a strength test of the welding structure formed by the welding method according to the comparative example.

FIG. 7 is a view comparing the results of a strength test of the welding structure 1 formed by the welding method according to the first example embodiment, and the results of a strength test of the welding structure 90 formed by the welding method according to the comparative example, with FIG. 7A showing the results of the strength test for the welding method according to the first example embodiment, and FIG. 7B showing the results of the strength test for the welding method according to the comparative example.

In FIG. 7, the vertical axis represents a load applied to the welding structure, and the horizontal axis represents the elapsed time. That is, FIG. 7 is a graph showing the change in load over time. Here, in the graph in FIG. 7, an energy absorption amount of the welding structure is indicated by the area of a region (shown by the slanted lines) enclosed by the curved line indicating the change in the load over time, and the vertical and horizontal axes.

Here, an energy absorption amount S1 of the welding structure 1 according to the first example embodiment that is shown in FIG. 7A is greater than an energy absorption amount S2 of the welding structure 90 according to the comparative example that is shown in FIG. 7B. This is because the welding structure 1 according to the first example embodiment fractures at the base material (i.e., the welding objects), as described above with reference to FIG. 4. Therefore, the energy absorption amount is able to be improved, as shown in FIG. 7.

Second Example Embodiment

Next, a second example embodiment of the invention will be described. In the welding structure 1 of the second example embodiment, the welding objects 2 and 4 are joined together by the weld 10, similar to the welding structure 1 according to the first example embodiment. The weld 10 is formed by a plurality of nuggets 12, similar to the first example embodiment. The nuggets 12 are formed arranged such that ½<d/p≤1, similar to the first example embodiment. Further, the second example embodiment differs from the first example embodiment in that the nuggets 12 are formed such that d≤3T. In other words, in the second example embodiment, the nuggets 12 are formed such that the ratio d/T of the nugget diameter d to the total thickness T is equal to or less than 3. In the second example embodiment, this kind of structure makes it possible to inhibit molten metal (i.e., the nuggets 12) from running (sagging) under its own weight, even when laser welding is performed with the welding objects 2 and 4 in vertically arranged positions.

Figure 8:
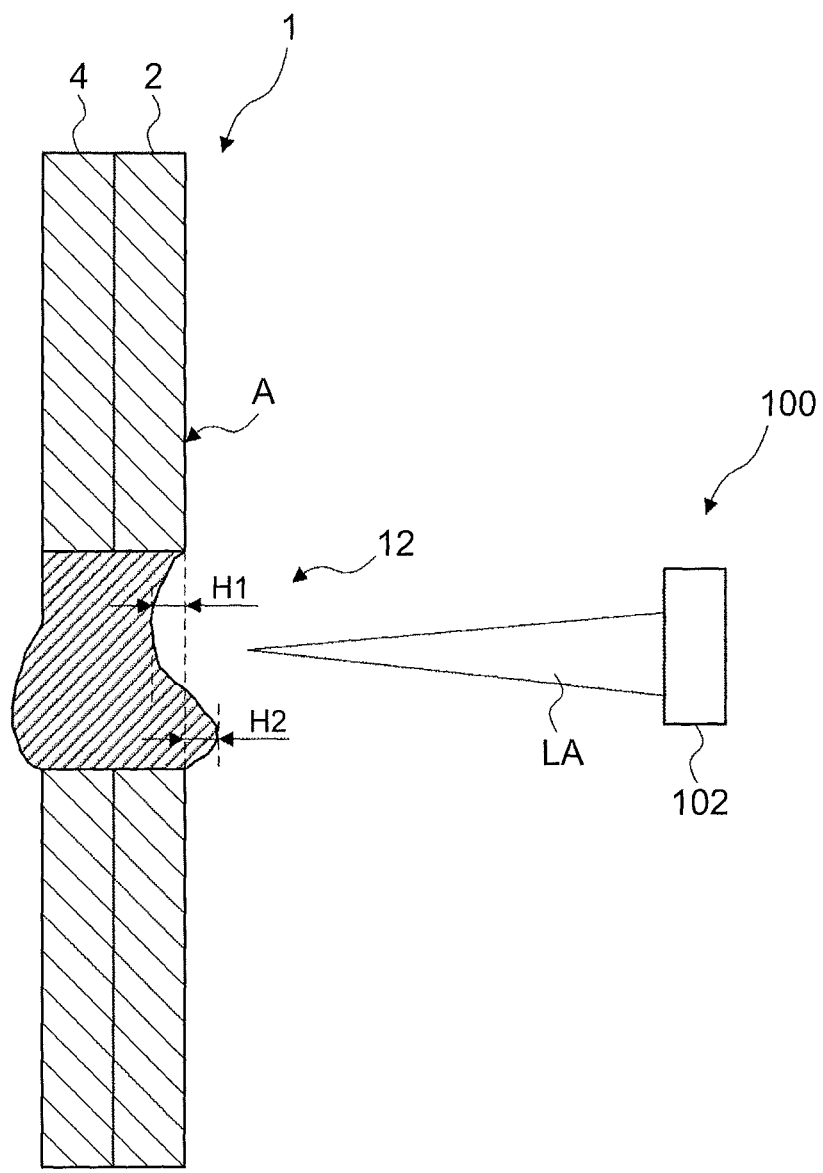
FIG. 8 is a view related to a second example embodiment of the invention, which shows welding being performed with welding objects in vertically arranged positions.

FIG. 8 is a view showing welding being performed with the welding objects 2 and 4 in vertically arranged positions. As shown in FIG. 8, with the welding method according to the second example embodiment, in this state, the welding objects 2 and 4 are arranged vertically. Then, the emitting portion 102 of the welding apparatus 100 emits the laser light LA at the welding object 2 in the horizontal direction.

At this time, the formed nuggets 12 may sag under their own weight by the molten metal moving downward under its own weight. Here, if the molten metal moves downward under its own weight, a recess will consequently be created on the upper side of the nugget 12, and tension will be generated on the lower side, as shown in FIG. 8. Here, the amount of recess from a surface A of the welding object 2 on the upper side of the nugget 12 will be referred to as "upper side recess amount H1". Also, the amount of tension from the surface A of the welding object 2 on the lower side of the nugget 12 will be referred to as "lower side protrusion amount H2".

Figure 9A:
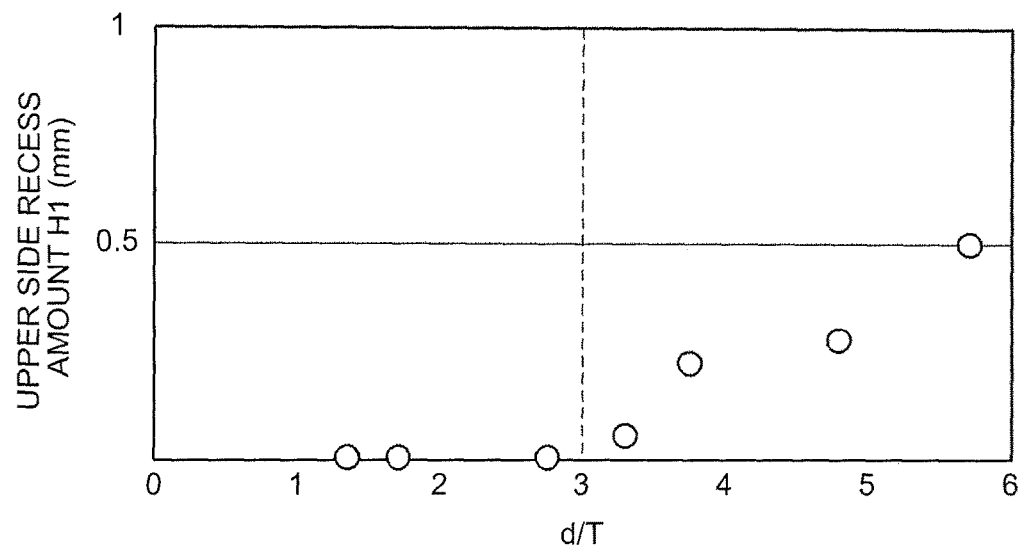
FIG. 9A is a graph showing the results from measuring the relationship between a ratio of nugget diameter to total thickness, and an upper side recess amount.
Figure 9B:
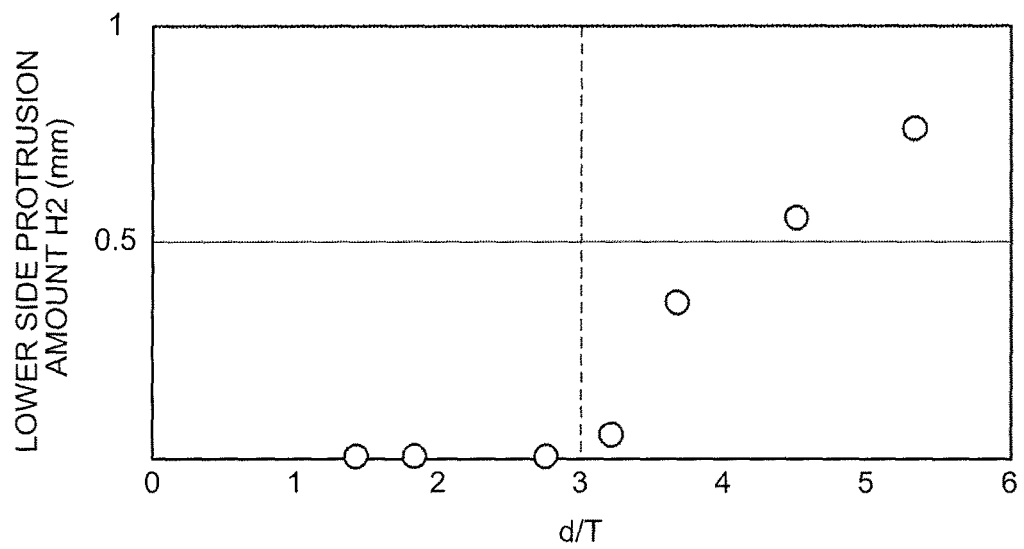
FIG. 9B is a graph showing the results from measuring the relationship between the ratio of nugget diameter to total thickness, and a lower side protrusion amount.

FIG. 9 is a graph showing the results from measuring the relationship between the ratio d/T of the nugget diameter d to the total thickness T, and the upper side recess amount H1 and the lower side protrusion amount H2, with FIG. 9A being a view of the relationship between the ratio d/T and the upper side recess amount H1, and FIG. 9B being a view of the relationship between the ratio d/T and the lower side protrusion amount H2.

As shown in FIG. 9A, when 0<d/T≤3, the upper side recess amount H1 is substantially 0. On the other hand, when 3<d/T, the upper side recess amount H1 is a value exceeding 0, and the upper side recess amount H1 increases as d/T increases. Also, as shown in FIG. 9B, when 0<d/T≤3, the lower side protrusion amount H2 is substantially 0. On the other hand, when 3<d/T, the lower side protrusion amount H2 is a value exceeding 0, and the lower side protrusion amount H2 increases as the d/T increases. Therefore, under a condition of 0<d/T≤3, the nugget 12 is able to be inhibited from sagging under its own weight. Therefore, in the second example embodiment, the nugget 12 is able to be inhibited from sagging under its own weight even when the welding objects 2 and 4 are in vertically arranged positions.

Figure 10:
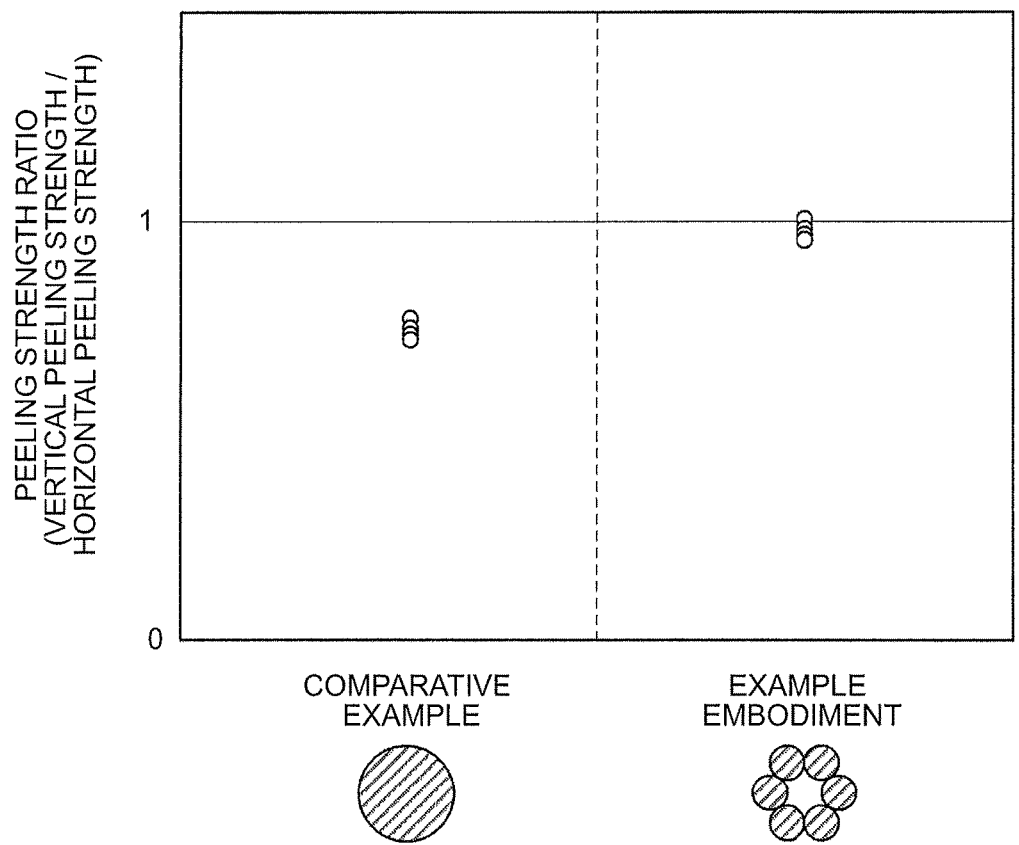
FIG. 10 is a view comparing the results of a strength test of a welding structure formed by the welding method according to the second example embodiment, and the results of a strength test of a welding structure formed by a welding method of the comparative example.

FIG. 10 is a view comparing the results of a strength test of the welding structure 1 formed by the welding method according to the second example embodiment, and the results of a strength test of a welding structure formed by the welding method of a comparative example. Here, the welding method according to the comparative example is similar to that described above with reference to FIG. 5. Also, FIG. 10 shows an example of a case in which the weld 10 is formed with six nuggets 12. Also, in FIG. 10, the vertical axis represents a peeling strength ratio. The peeling strength ratio in FIG. 10 represents a ratio of the peeling strength when welding is performed with the welding objects 2 and 4 in vertically arranged positions (i.e., the vertical peeling strength), as shown in FIG. 8, when the peeling strength when welding is performed with the welding objects 2 and 4 in horizontally arranged positions (i.e., horizontal peeling strength), as shown in FIG. 1A. Also, when the diameter of the weld 92 according to the comparative example is d, the value of d/T is approximately 5.5. Also, when the diameter of the nuggets 12 according to the second example embodiment is d, the value of d/T is approximately 1.5.

As shown in FIG. 10, with the weld 92 according to the comparative example, the peeling strength ratio is less than 1. That is, in the comparative example, when welding is performed with the welding objects 2 and 4 in vertically arranged positions, the weld strength is worse than it is when welding is performed with the welding objects 2 and 4 in horizontally arranged positions. On the other hand, with the nuggets 12 (i.e., the weld 10) according to the second example embodiment, the peeling strength ratio is approximately 1. That is, in the second example embodiment, even if welding is performed with the welding objects 2 and 4 in vertically arranged positions, weld strength equivalent to that obtained when welding is performed with the welding objects 2 and 4 in horizontally arranged positions is ensured.

In the weld 92 according to the comparative example, if the diameter is increased in order to ensure weld strength, the value of the diameter d with respect to the total thickness T ends up increasing. Therefore, when welding is performed with the welding objects 2 and 4 in vertically arranged positions, the nuggets 12 will end up sagging under their own weight. As a result, weld strength is worse than it is when welding is performed with the welding objects 2 and 4 in horizontally arranged positions.

On the other hand, in this example embodiment, weld strength is able to be ensured even if the diameter of the nuggets is small. Therefore, in the second example embodiment, the nuggets 12 are able to be inhibited from sagging under their own weight even when welding is performed with the welding objects 2 and 4 in vertically arranged positions. That is, in the second example embodiment, the molten metal is able to be inhibited from running under its own weight regardless of the welding point posture. Furthermore, in the second example embodiment, weld strength equivalent to that obtained when welding is performed with the welding objects 2 and 4 in horizontally arranged positions is able to be ensured.

Third Example Embodiment

Next, a third example embodiment of the invention will be described. In a welding structure 1 according to the third example embodiment, welding objects 2 and 4 are joined together by a weld 10, similar to the welding structure 1 according to the first example embodiment. The weld 10 is formed by a plurality of nuggets 12, similar to the first example embodiment. The nuggets 12 are formed arranged such that $½<d/p≤1$, similar to the first example embodiment. Further, the third example embodiment differs from the first example embodiment in that the nuggets 12 are formed such that $d≤1.5t$. In other words, in the third example embodiment, the nuggets 12 are formed such that the ratio d/t of the nugget diameter d to the thickness t of the welding object 4 on the side where the laser light is not emitted is equal to or less than 1.5. In the third example embodiment, this kind of structure makes it possible to appropriately perform welding, even when the welding objects 2 and 4 are die-cast material or castings or the like.

Figure 11A:
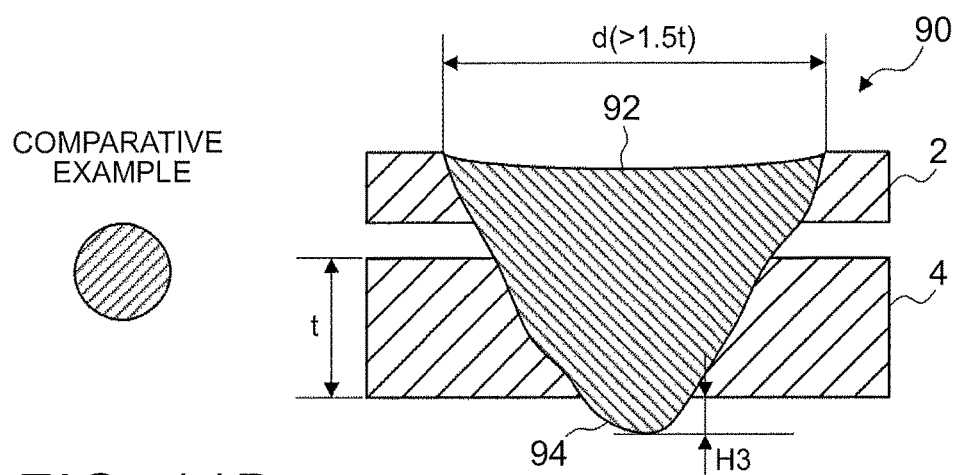
FIG. 11A is a view of a weld shape of a weld formed by a welding method according to a comparative example.
Figure 11B:
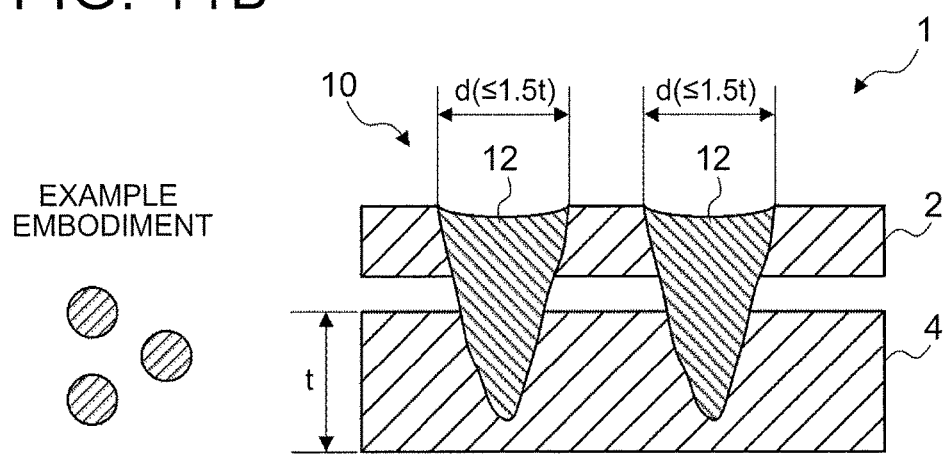
FIG. 11B is a view of a weld shape of a weld formed by a welding method according to a third example embodiment of the invention.

FIG. 11 is a view comparing the weld shape of the weld 10 formed by the welding method according to the third example embodiment and the weld shape of the weld 92 formed by the welding method according to the comparative example. FIG. 11A is a sectional view of the weld 92 of the welding structure 90 formed by the welding method according to the comparative example, and FIG. 11B is a sectional view of the weld 92 of the welding structure 1 formed by the welding method according to the third example embodiment. FIG. 11B illustrates a case in which the weld 10 is formed with three nuggets 12.

In FIG. 11, at least one of the welding objects 2 and 4 is made of die-cast material. When welding is performed on the die-cast material, gas or impurities or the like in the die-cast material expand. As a result, molten metal melted by welding may flow out from the side where the laser beam is not emitted, and a protrusion formed by the molten metal that flowed out may form. As a result, the weld shape deteriorates.

As shown in FIG. 11A, the weld 92 of the welding structure 90 according to the comparative example is formed by a single generally circular nugget. Here, in order to ensure weld strength, the diameter of the weld 92 must be increased. Therefore, the diameter d of the weld 92 is greater than 1.5 times the thickness t of the welding object 4. When the diameter d of the weld 92 is increased with respect to the thickness t of the welding object 4 in this way, the molten metal that forms the weld 92 flows out from the lower surface (i.e., the surface on the side where the laser light is not emitted) of the welding object 4, such that a protrusion 94 forms, as shown in FIG. 11A. The protrusion amount indicative of the height of this protrusion is denoted as H3.

On the other hand, the weld 10 of the welding structure 1 according to the third example embodiment is formed by a plurality (three in FIG. 11B) of nuggets 12, as shown in FIG. 11B. Here, as described above, in this example embodiment, the condition for ensuring weld strength is that $½<d/p≤1$, so there is no need to increase the nugget diameter d. Therefore, in this third example embodiment, a protrusion will not form on the lower surface of the welding object 4, as shown in FIG. 11B.

Figure 12:
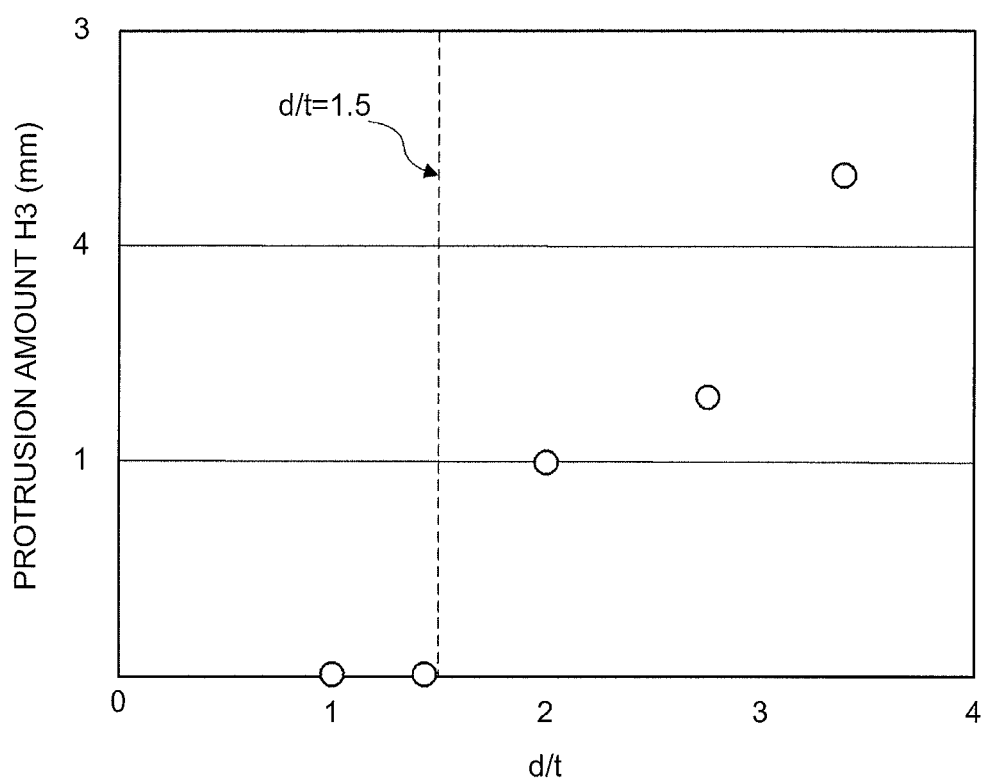
FIG. 12 is a graph showing the results from measuring the relationship between the ratio of nugget diameter to thickness, and a protrusion amount.

FIG. 12 is a graph illustrating the results from measuring the relationship between the ratio d/t of the nugget diameter d with respect to the thickness t, and the protrusion amount H3. This measurement is taken using a welding structure in which the welding objects 2 and 4 are made of die-cast material.

As shown in FIG. 12, when $0<d/t≤1.5$, the protrusion amount H3 is 0. That is, no protrusion is formed at this time. On the other hand, when $1.5<d/t<4$, the protrusion amount H3 is a value exceeding 0, and the protrusion amount H3 increases as d/t increases. Therefore, under a condition of $d/t≤1.5$, a protrusion is able to be inhibited from forming even when the welding objects 2 and 4 are made of die-cast material. Therefore, in the third example embodiment, the weld shape is able to be improved, while ensuring weld strength, similar to the first example embodiment.

Modified Examples

The invention is not limited to the example embodiments described above, and may be modified as appropriate without departing from the scope thereof. For example, in the example embodiments described above, the number of welding objects is two, but the number of welding objects is not limited to this. The number of welding objects may also be three or more. Also, the welding method according to the example embodiments may also be applied to any suitable welding object, regardless of whether the welding object has been surface treated.

Figure 13A:
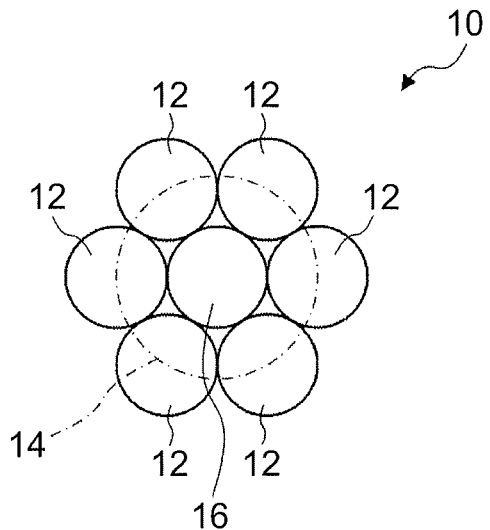
FIG. 13A is a view illustrating a weld according to a modified example.
Figure 13B:
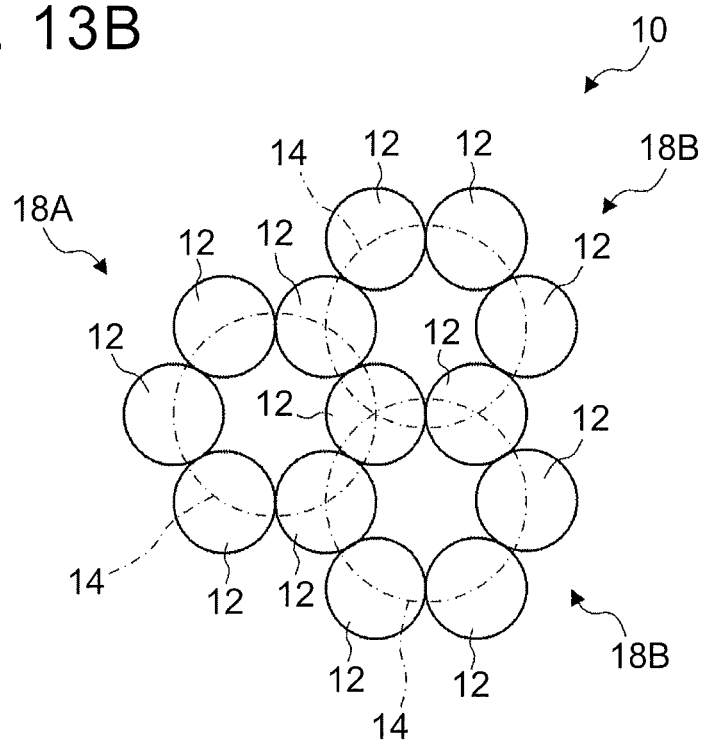
FIG. 13B is a view illustrating a weld according to another modified example.

Also, in the example embodiments described above, the weld 10 is formed with a plurality of nuggets 12 arranged along the virtual closed curve 14, but the weld 10 is not limited to this kind of structure. For example, the weld 10 may also be formed by forming a nugget 16 to the inside of the plurality of nuggets 12 arranged along the virtual closed curve 14, as shown in FIG. 13A. Also, for example, the weld 10 may be formed by combining nugget groups 18A, 18B, and 18C each of which is formed by a plurality of nuggets 12 arranged along the virtual closed curve 14, as shown in FIG. 13B. At this time, the nuggets 12 that make up the nugget group 18A, the nuggets 12 that make up the nugget group 18B, and the nuggets 12 that make up the nugget group 18C may also be shared.

Also, in the example embodiments described above, the emitting portion 102 sets the laser light emitting position according to control by the control portion 104, but the emitting portion 102 is not limited to this kind of structure. For example, the laser light emitting position may also be set by an operation by an operator.

What is claimed is:

1. A welding method comprising:
overlapping a plurality of welding objects constituted by at least one aluminum alloy; and
emitting, from a thickness direction of the overlapped welding objects, laser light to a surface of one of the welding objects to join together the welding objects by making a weld that includes a plurality of nuggets formed along a closed curve on the welding objects, each of the nuggets being formed by scanning the laser light along a spiral-shaped path at a position that the nugget is to be formed, wherein:
the surface is arranged during the emitting of the laser light in a direction having a nonzero vertical component,
a ratio of a diameter of each of the nuggets to a pitch dimension between ones of the nuggets that are adjacent to each other is larger than ½ and no more than 1,
a ratio of the diameter of each of the nuggets to a thickness of the overlapped plurality of welding objects is no more than 3, and
the thickness of the overlapped plurality of welding objects corresponds to a total value of thicknesses of the overlapped plurality of welding objects and a thickness of a gap between the welding objects.

2. The welding method according to claim 1, wherein a ratio of the diameter of each of the nuggets to a thickness of one of the welding objects on a side where the laser light is not emitted is no more than 1.5.

3. A welding structure comprising:
a plurality of welding objects overlapped and joined together by a weld formed by emitting, from a thickness direction of the overlapped welding objects, laser light to a surface of one of the welding objects, the surface being arranged during the emitting of the laser light in a direction having a nonzero vertical component, wherein:
the weld includes a plurality of nuggets formed along a closed curve on the welding objects,
a ratio of a diameter of each of the nuggets to a pitch dimension between ones of the nuggets that are adjacent to each other is larger than ½ and no more than 1,
a ratio of the diameter of each of the nuggets to a thickness of the overlapped plurality of welding objects is no more than 3,
the thickness of the overlapped plurality of welding objects corresponds to a total value of thicknesses of the overlapped plurality of welding objects and a thickness of a gap between the welding objects, and
each of the welding objects is constituted by an aluminum alloy.

4. The welding structure according to claim 3, wherein a ratio of the diameter of each of the nuggets to a thickness of one of the welding objects on a side where laser light is not emitted is no more than 1.5.

5. The welding method according to claim 1, wherein the nuggets are formed such that an amount of recess from a surface of the welding objects on one side of the nuggets is substantially zero and an amount of protrusion from a surface of the welding objects on an opposite side of the nuggets is substantially zero.

6. The welding structure according to claim 3, wherein an amount of recess from a surface of the welding objects on one side of the nuggets is substantially zero and an amount of protrusion from a surface of the welding objects on an opposite side of the nuggets is substantially zero.

7. The welding structure according to claim 3, wherein the plurality of nuggets consists of three of the nuggets.

8. A welding method comprising:
overlapping a plurality of welding objects constituted by at least one aluminum alloy; and
emitting, from a thickness direction of the overlapped welding objects, laser light to a surface of one of the welding objects to join together the welding objects by making a weld that includes a plurality of nuggets formed along a closed curve on the welding objects, molten metal of each of the nuggets reaching a surface of the welding objects on a side where the laser light is not emitted during the laser welding, wherein:
the surface is arranged during the emitting of the laser light in a direction having a nonzero vertical component,
a ratio of a diameter of each of the nuggets to a pitch dimension between ones of the nuggets that are adjacent to each other is larger than ½ and no more than 1,
a ratio of the diameter of each of the nuggets to a thickness of the overlapped plurality of welding objects is no more than 3, and
the thickness of the overlapped plurality of welding objects corresponds to a total value of thicknesses of the overlapped plurality of welding objects and a thickness of a gap between the welding objects.

9. The welding method according to claim 1, wherein:
none of the welding objects constituted by at least one aluminum alloy are a brazing sheet, and
the laser light is emitted directly on the surface of the one welding object.

10. The welding structure according to claim 3, wherein:
none of the welding objects, each of which is constituted by an aluminum alloy, are a brazing sheet, and
the weld is formed by emitting laser light directly on the surface of the one welding object.

11. The welding method according to claim 8, wherein:
none of the welding objects constituted by at least one aluminum alloy are a brazing sheet, and
the laser light is emitted directly on the surface of the one welding object.

* * * * *